(12) United States Patent
Meynier et al.

(10) Patent No.: US 7,420,879 B2
(45) Date of Patent: Sep. 2, 2008

(54) DEVICE FOR SEISMIC EMISSION IN AN UNDERGROUND FORMATION AND METHOD FOR IMPLEMENTING SAME

(75) Inventors: Patrick Meynier, Chatou (FR); Frédéric Huguet, Fosses (FR); Julien Meunier, Paris (FR)

(73) Assignees: Compagnie Generale de Geophysique, Massy Cedex (FR); Gaz de France-Service National, Paris (FR); Institut Francais du Petrole, Rueil Malmaison, Cedex (FR)

( * ) Notice: Subject to any disclaimer, the term of this patent is extended or adjusted under 35 U.S.C. 154(b) by 0 days.

(21) Appl. No.: 10/529,374

(22) PCT Filed: Sep. 24, 2003

(86) PCT No.: PCT/FR03/02800

§ 371 (c)(1),
(2), (4) Date: Oct. 5, 2005

(87) PCT Pub. No.: WO2004/029661

PCT Pub. Date: Apr. 8, 2004

(65) Prior Publication Data

US 2006/0131099 A1    Jun. 22, 2006

(30) Foreign Application Priority Data

Sep. 26, 2002 (FR) .................................. 02 11945

(51) Int. Cl.
*G01V 1/155* (2006.01)

(52) U.S. Cl. ...................................... 367/189; 181/106

(58) Field of Classification Search ................. 367/189; 181/121, 106

See application file for complete search history.

(56) References Cited

U.S. PATENT DOCUMENTS 4,805,725 A * 2/1989 Paulsson ...................... 181/106
4,834,210 A * 5/1989 Kennedy .................... 181/106

(Continued)

FOREIGN PATENT DOCUMENTS

FR    2 766 929       2/1999

(Continued)

*Primary Examiner*—Mark Hellner
(74) *Attorney, Agent, or Firm*—Antonelli, Terry, Stout & Kraus, LLP.

(57) ABSTRACT

A device for seismic emission in an underground formation comprising one or more vibrators of any type and method for implementing same. According to a preferred embodiment, each vibrator comprises at least one pillar (1) of sensitive elements (of piezoelectric type for example) between two end plates or slabs (2, 3) and a signal generator for applying vibrational signals to the pillar. The pillar (1) is coated with a protective sheath (4) and the vibrator is positioned in a well or cavity (W) and embedded in a mass of a solid coupling material (7) in contact with protective sheath (4) and the two end plates (2, 3) over at least part of each of the respective faces thereof, which provides coupling of the vibrator with the surrounding formation. The vibrators can be buried at intervals in relation to one another in a well. Sequential triggering thereof with selected delays allows reinforcement of the waves emitted by the device in a preferred direction. Applications include repetitive seismic monitoring of an underground reservoir during development for example.

26 Claims, 3 Drawing Sheets

U.S. PATENT DOCUMENTS 4,991,685 A * 2/1991 Airhart ........................ 181/106
5,360,951 A * 11/1994 Turpening .................... 181/113
5,724,311 A 3/1998 Laurent et al.
6,119,804 A * 9/2000 Owen ........................... 181/113
6,488,117 B1 * 12/2002 Owen ........................... 181/121
7,104,357 B2 * 9/2006 Baroni et al. ................ 181/121

FOREIGN PATENT DOCUMENTS

GB 2 185 574 A 7/1987

* cited by examiner

FIG.2B
FIG.2C
FIG.2A
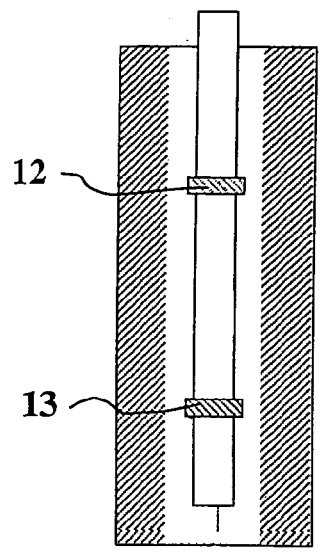
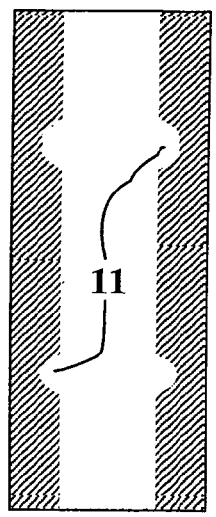
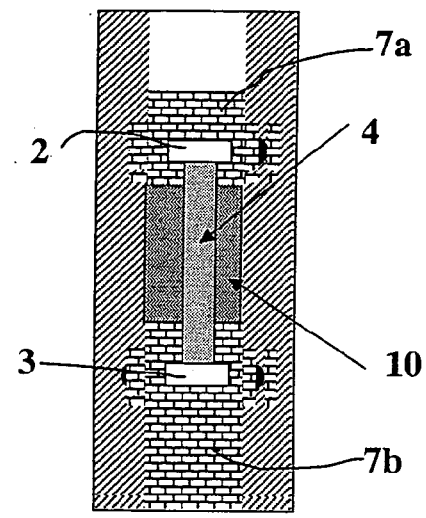
FIG.4
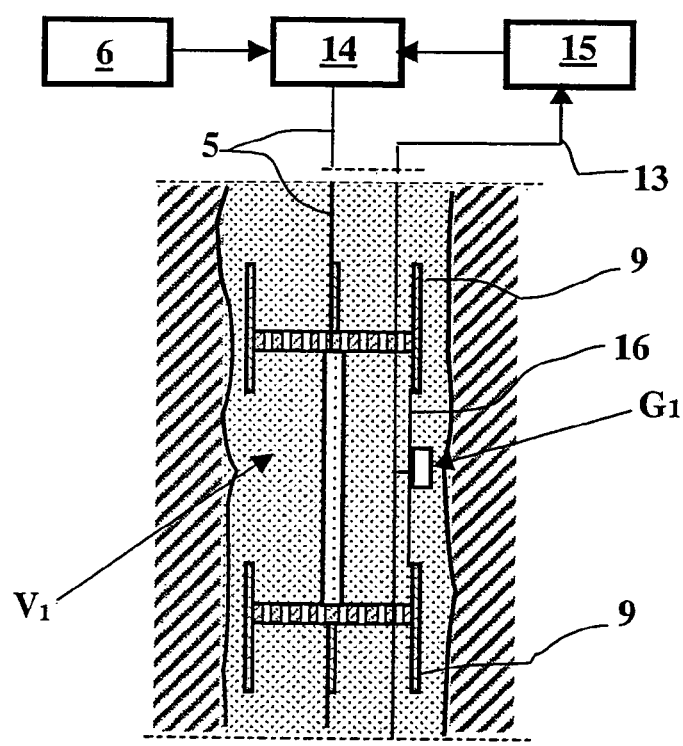
FIG.5
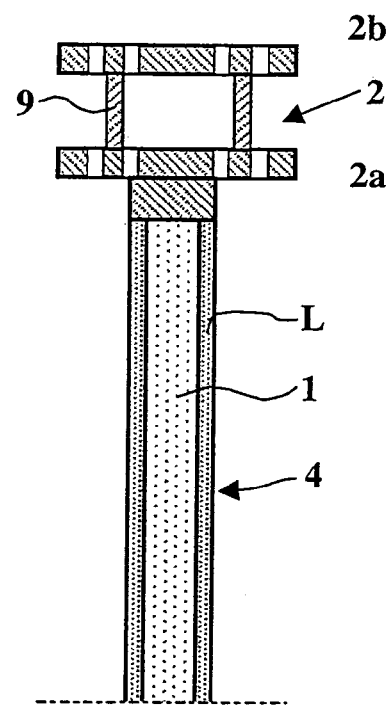

DEVICE FOR SEISMIC EMISSION IN AN UNDERGROUND FORMATION AND METHOD FOR IMPLEMENTING SAME

BACKGROUND OF THE INVENTION

1. Field of the Invention

The present invention relates to a device for seismic emission in an underground formation and to a method for implementing it.

Such a seismic emission device finds applications notably in the field of seismic operations where seismic images of an underground formation to be explored are formed from elastic waves picked up by suitable seismic receivers, the waves being reflected by the subsoil discontinuities in response to waves emitted by a source such as an electromechanical vibrator.

2. Description of the Prior Art

Seismic monitoring of an underground reservoir is generally carried out by coupling with the underground seismic sources and receivers in various combinations where the sources and/or the receivers are arranged at the surface or in the vicinity thereof, or in one or more wells through the explored formation. A series of seismic emission-reception cycles are carried out by changing each time the location of the seismic source in relation to the axis of the well where the receivers are installed, according to a technique referred to as walk-away technique, and by recording the arrivals at receivers R1 to Rn as a function of the propagation time t.

The seismic sources used are in most cases electromechanical vibrators: electrohydraulic, piezoelectric vibrators, etc. Piezoelectric type vibrators are for example described in French Patent 2,791,180 or and in U.S. Pat. No. 5,360,951.

Monitoring of the evolution of reservoirs generally requires seismic monitoring operations at spaced-out intervals. In practice, the surface seismic equipment has to be reinstalled for each new seismic recording session and the conditions of emission of the previous seismic operations are preferably reproduced.

A known method of monitoring a hydrocarbon reservoir or an underground fluid reservoir comprises using a monitoring system including receiving antennas formed by interconnecting seismic receivers, permanently installed respectively in shallow holes, with connection means to which linking cables linked to a seismic laboratory can be connected, and a vibrator truck that is moved in the field.

Using a mobile source such as a vibrator involves drawbacks, especially within the context of periodic monitoring of an underground storage reservoir. A movable source does not allow sufficient reproducibility in time and space of the seismic waves emitted. It is very difficult to position the source exactly at the same points it occupied during the previous emission-reception cycles and, in the event that this point is exactly the same, to obtain exactly the same ground coupling coefficient.

French Patent 2,728,973 and US counterpart U.S. Pat. No. 5,724,311 describe a method and a device intended for permanent seismic monitoring of an underground formation. In the context of regular long-term monitoring operations in an underground zone, a seismic emission-reception device is permanently installed on the development site so as to have each time stable operating conditions again: identical emission-reception locations, identical quality of coupling with the formations, etc. The device comprises a plurality of seismic sources (electromechanical vibrators for example) at fixed locations at the surface or buried at a shallow level, which are supplied and triggered by a central control and recording station. The seismic sources and the connection network can be buried or permanently installed at the surface, and associated with at least one set of receivers permanently coupled with the ground at the surface or with the wall of at least one well drilled through the underground zone. All these permanently installed sources whose coupling with the surrounding formations remains stable and this supply network, at least partly buried, whose surface coverage area is limited, allow carrying out a series of seismic monitoring operations under stable operating conditions, without any risk of incompatibility with the development site activities.

French Patent 2,728,973 and US counterpart U.S. Pat. No. 5,724,311) describe another seismic device intended for permanent monitoring of an underground formation by means of one or more seismic emission-reception sets each comprising a source such as a vibrator and a receiving antenna having a plurality of elastic wave receivers such as geophones and/or hydrophones lowered in a well and coupled with the formation. The seismic source can be arranged at the surface on a concrete block secured to the ground. It is preferably fastened to a flagstone in a cavity close to the well or formed by widening the section of the well in its upper part so as to decrease the disturbances linked with the hydrometric variations of the ground. The receivers and the source are connected to an outside signal acquisition and control station. The operations allowing setting of these devices are relatively simple and the ground coverage area in the various wells is reduced, which facilitates their integration in reservoir development sites.

By means of these permanently installed sources which are easy to integrate in reservoir development sites or fluid storage sites, and whose coupling quality with the surrounding formations is known and stable, a series of seismic monitoring operations can be carried out under similar operating conditions. The seismic trace sets can be usefully compared and their differences reflect the changes occurred in the formations.

The aforementioned vibrators are coupled with the formations by a limited surface, which involves notable drawbacks. In fact, the radiation diagram favors the formation of surface waves and of S type waves which are propagated horizontally, disturb recordings and complicate the processing thereof. Furthermore, their compression wave yield is relatively low and, since their depth of burial is relatively small, variations of the petroelastic characteristics of the weathered zone, due to the weather conditions, cannot be completely disregarded with such waves.

SUMMARY OF THE INVENTION

The device according to the invention emits waves in an underground formation. It comprises one or more vibrator(s) including each two slabs, at least one motive element suited to generate vibrations and to communicate them to the plates, and a generator for applying periodic control signals to the motive element. Each vibrator is positioned in a well or cavity and embedded in at least one solid material providing coupling thereof with the underground formation, this material being in contact with the two slabs over at least part of each of the respective faces thereof.

The system according to the invention is more particularly useful in the context of long-term monitoring operations in an underground reservoir under development (a fluid storage reservoir for example or an oil reservoir), referred to as repetitive seismic surveys, where seismic images of the subsoil obtained at regular intervals are compared so as to detect changes that may have occurred therein as a result of its development. These are long-lasting operations because the variations to be observed are relatively slow Each vibrator can comprise anchor bars associated with at least one of the slabs to increase coupling of the vibrator with the mass of coupling material.

According to an embodiment, each slab comprises at least two plates arranged at a distance from one another and connected by the anchor bars.

Preferably, the outer surface of each plate and that of the anchor bars are provided with an uneven relief (grooved surface) to increase the area of coupling of the device with the coupling material.

The plates can be perforated so as to facilitate penetration of the coupling material in the space contained between the two plates.

A single coating material distributed so as to provide coupling with the formation, at least at the opposite ends of the vibrator, can be used for example. It is also possible to use at least two different coating materials, a first material being distributed in two distinct masses to provide coupling of the vibrator with the formation, at the opposite ends thereof, and a second material being inserted between the two masses.

With its slabs in close contact with the coupling material, the energy efficiency of the vibrator is improved and the emission of S waves is greatly attenuated by the motion in opposite directions of the two plates.

According to a preferred embodiment, the device comprises several vibrators connected to a signal generator, the vibrators being arranged at intervals in relation to one another along a well and all embedded in a coupling material. A control box can be inserted between the vibrators and the signal generator, which allows them to be triggered successively so as to obtain an emission oriented mainly according to a predetermined pattern.

In order to allow sequential triggering of the vibrators, the device comprises for example a seismic receiver coupled with the formations surrounding the well at a determined depth which is connected to an acquisition and processing unit suited for sequential control of the vibrators.

It can also comprise seismic receivers associated with the various vibrators (they are for example fastened to supports secured to the anchor bars) and connected to the acquisition and processing unit which determines the traveltimes of the waves between the locations of the various vibrators and to control them sequentially.

The motive elements can be of any type: electromechanical, electromagnetic, hydraulic, etc. According to a preferred embodiment, each vibrator comprises a pillar of sensitive elements (for example of piezoelectric or magnetostrictive sensitive elements) coated with a protective sheath, the coupling material being in contact with the protective sheath and with the two end plates over at least part of each of the respective faces thereof. The space between the sheath and the pillar of sensitive elements can be filled with a liquid such as oil.

The method according to the invention allows to generation in an underground formation vibrational signals according to an oriented emission pattern. It comprises:

installing in the same well vibrators each comprising each two slabs, at least one motive element suited to generate vibrations and to communicate them to the plates and a generator for applying periodic control signals to the motive element, each vibrator being positioned in a well or cavity and embedded in at least one solid material providing coupling thereof with the underground formation, this material being in contact with the two end slabs over at least part of each of the respective faces thereof; and sequentially controlling the various vibrators by means of a control box with time lags between the respective triggering times that depend on the intervals between the locations of the vibrators and the velocity of propagation of the waves in the formations surrounding the well.

Sequential control of the vibrators comprises for example applying to the vibrators control signals at a fixed frequency f whose phase $\Phi_i$ is related to frequency f and to the time lag by the relation $\Phi_i = 2\pi.f.t_i$.

It is also possible to sequentially control the vibrators by applying thereto control signals of distinct fixed frequencies so as to allow separation thereof.

According to an embodiment, the method comprises coupling with the formation surrounding the well of a seismic receiver and prior determination of the traveltimes of the waves respectively between each vibrator and the receiver.

According to another embodiment, the method comprises adding to the vibrators receivers connected to a signal acquisition and processing unit and sequential triggering of the various vibrators with time lags between the respective triggering times calculated by said unit by correlating the signals produced by the various receivers.

BRIEF DESCRIPTION OF THE DRAWINGS

Other features and advantages of the device and of the method according to the invention will be clear from reading the description hereafter of an embodiment given by way of non limitative example, with reference to the accompanying drawings wherein:

FIG. 2a diagrammatically shows a coupling mode for each vibrator where the end slabs are separately coupled with the surrounding formations by a single coupling material;

FIGS. 2b and 2c respectively show cavities provided in the well at the level of each slab, and a particular mode allowing to create each cavity;

FIG. 4 diagrammatically shows a vibrator with an associated geophone, allowing another mode of sequential control of vibrators in a well; and FIG. 5 diagrammatically shows an embodiment of the device where each slab comprises two plates arranged parallel to one another.

DETAILED DESCRIPTION OF THE INVENTION

Figure 1:
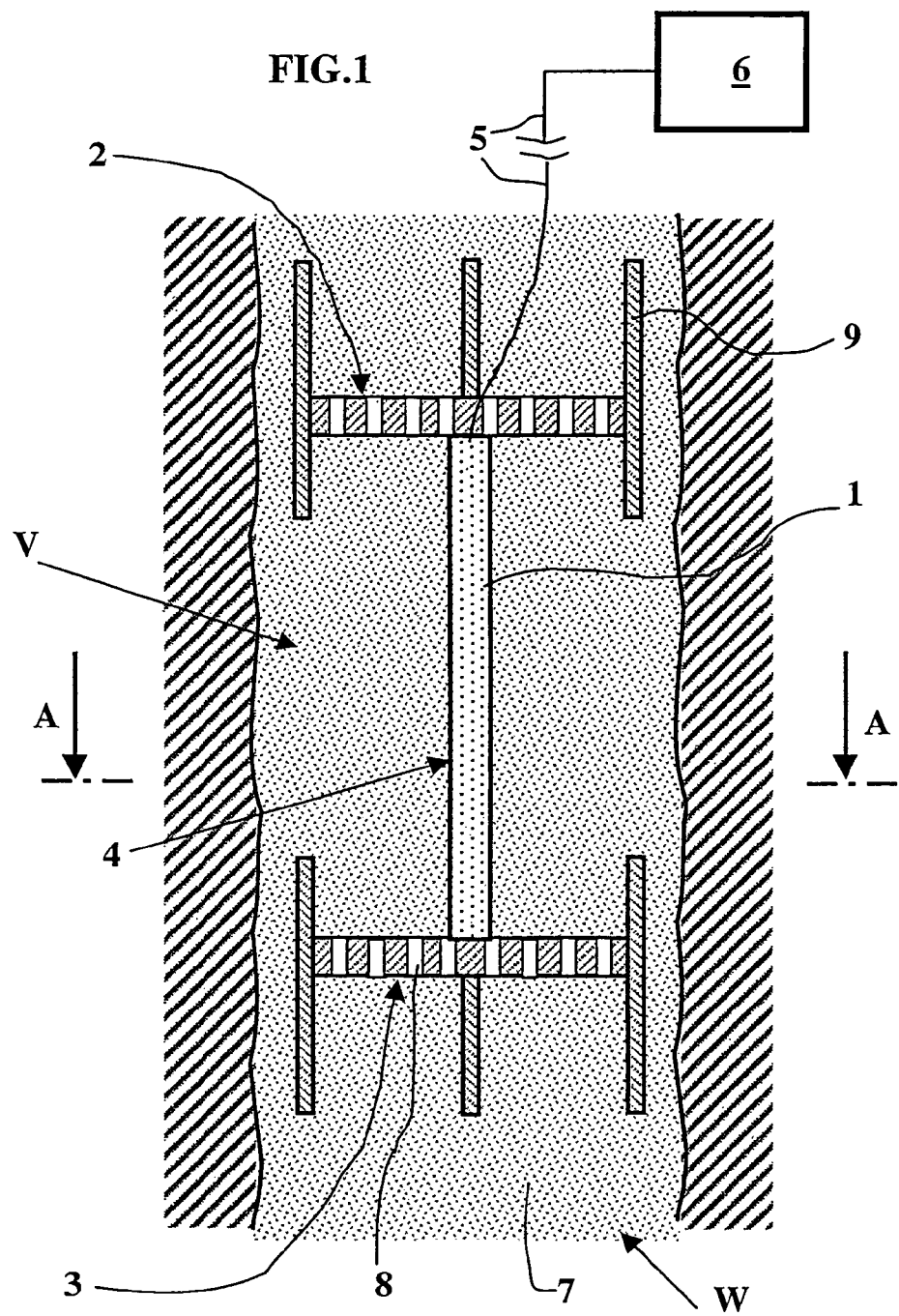
FIG. 1 diagrammatically shows a vibrator embedded in a coupling material such as cement or a similar material.
Figure 1A:
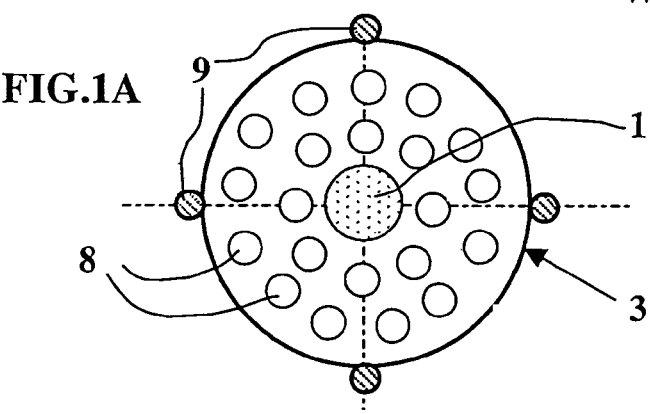
FIG. 1a shows an end plate of each vibrator with the anchor bars distributed on the periphery thereof.

The device according to the invention comprises at least one (and preferably more) vibrators V. The vibrators can be of any type: electromechanical, electromagnetic, hydraulic, etc.

In the description hereafter, by way of example the case of vibrators is considered comprising at least one pillar of sensitive elements (piezoelectric or magnetostrictive) 1 tightly associated at each of the opposite ends thereof with a plate 2, 3. The pillar of sensitive elements is centered in relation to slabs 2, 3 and it is covered with a deformable membrane 4. A connecting cable 5 connects pillar 1 to a control signal generator 6.

Vibrator V is arranged in a cavity or well W. A coupling material 7, such as cement or concrete, for example is injected into the well so as to be in intimate contact with pillar 1 over the total length thereof and also with the opposite faces of each slabs 2, 3. In order to allow coupling material 7 to be homogeneously distributed in the space between the slab, the latter can be provided with perforations 8. The diameter of slabs 2, 3 must correspond substantially to the diameter of the cavity or well W so as to obtain a maximum coupling surface area.

In order to further improve coupling and to distribute the stresses in a large volume of coupling material 7, anchor rods 9 of suitable length can be fastened to the periphery of slabs 2, 3.

According to the embodiment of FIG. 5, each slab 2, 3 comprises, as illustrated, at least two plates 2a, 2b arranged parallel to one another and connected by anchor rods 9. In order to improve coupling with coupling material 7, the outer surface of each plate 2a, 2b and of coupling rods 9 is preferably provided with an uneven relief such as grooves. The space between deformable tubular membrane 4 and pillar 1 of sensitive elements can be filled, as shown, with a liquid L such as oil.

The cement used for coupling has to dry without shrinking so as to ensure good coupling.

Instead of entirely embedding the vibrator in a single volume 7 of coupling material, it is also possible, as illustrated in FIG. 2a, to couple each slab separately with the surrounding formations, by means of two volumes 7a, 7b of this material. In order to isolate volumes 7a, 7b in relation to one another, another material 10 is poured between them. Bentonite or a similar material having the property of swelling once wet can be used to fill the intermediate space. This solution is useful for example when the mechanical properties of the coupling material are different from those of the surrounding formations.

According to an alternative embodiment, coupling of the vibrator with the formations can be improved if a chamber 11 is provided in the wall of the well at the level of each slab as shown in FIG. 2b. To create such a chamber, suitable drilling tools or explosive substances can for example be used. A solution is for example (FIG. 2B) in lowering into the well, at the planned point of burial of the vibrator, a rod 12 carrying two coils 13 of detonating cord, sufficiently spaced out, which are detonated.

Figure 3:
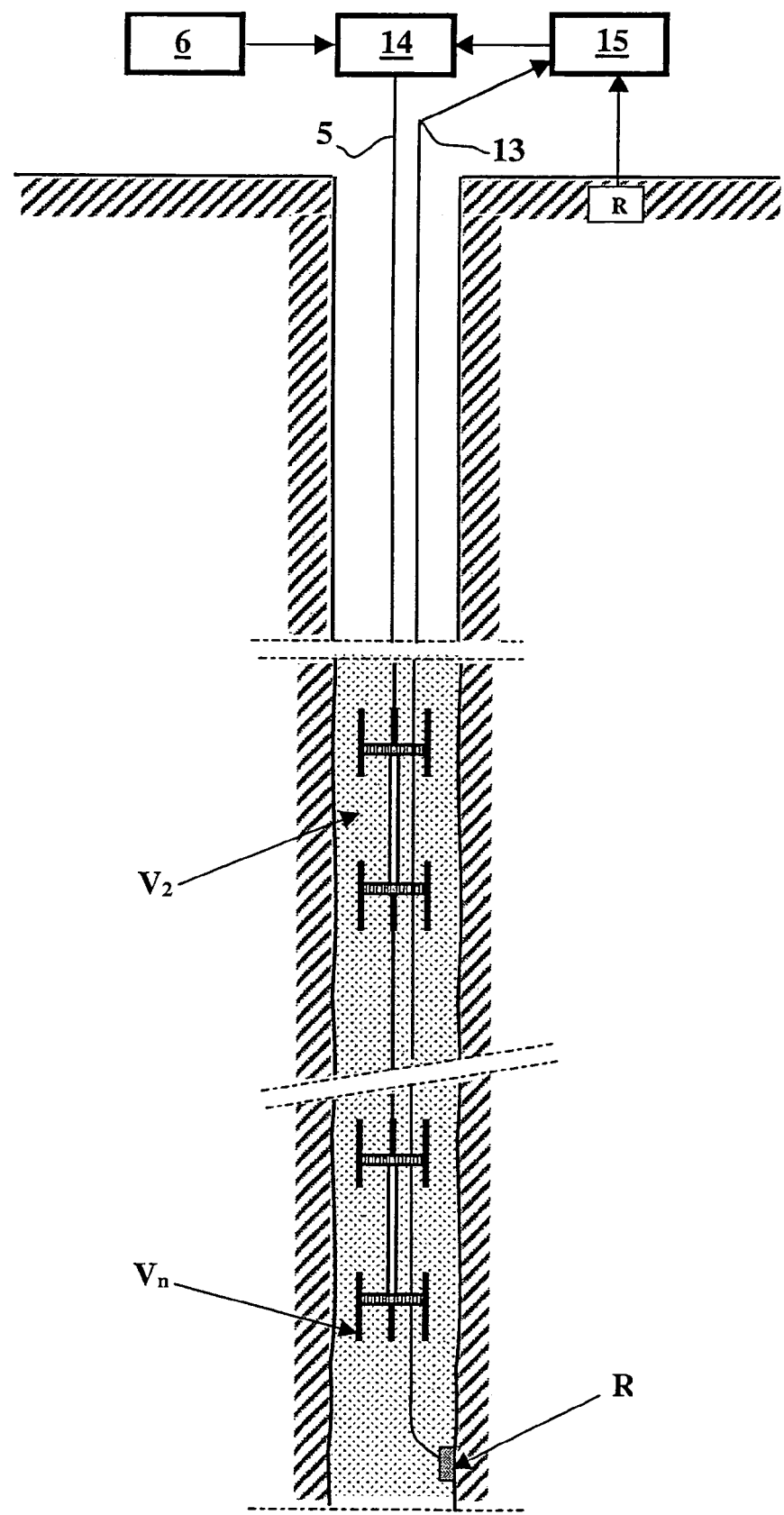
FIG. 3 diagrammatically shows a layout of several vibrators buried at different depths of a well, connected to a surface control system, allowing sequential control thereof with time lags taking account of the real velocity of the waves in the formations surrounding the well.

According to the embodiment of FIG. 3, the device comprises several vibrators V1, V2, . . . , Vn similar to the vibrator of FIG. 1 or 5, arranged at intervals along a well W. The vibrators are also embedded in one or more coupling materials 7, 10 (FIG. 1 or FIG. 2a).

With such a layout, a directivity effect can be obtained by connecting the various vibrators V1 to Vn to generator 6 by means of a control box 14 and by actuating them sequentially with selected time lags.

The vibrational signals emitted rather downwards are thus amplified to the detriment of those propagated in other directions. The amplitude of the first multiple reflected by the surface of the formation, whose instability is harmful to the signal repeatability, is thus notably decreased.

The triggering times are for example determined as follows.

A seismic receiver R (hydrophone, geophone or preferably a combination of these two pickups) is arranged preferably substantially vertical to the well containing the vibrators or at a sufficiently small horizontal distance so that the traveltimes between each vibrator and this receiver R are not substantially different from the vertical traveltimes. The receiver can be positioned in the well containing the vibrators and it is connected to an acquisition and processing unit 15 arranged at the surface for example. If several receivers are positioned along the well below the vibrators, the deepest one will for example be selected. A receiver arranged at the surface can also be used. The traveltime $\vartheta_i$ of the waves between each vibrator $V_i$ and this receiver R is first measured. The time lags $t_i$ ($_i$=1 to n) to be applied to the various vibrators $V_i$ are deduced from these traveltimes by the relation $t_i$=K+$\epsilon$.$\vartheta_i$ where K is a constant and $\epsilon$ is +1 or −1 according to whether receiver R is arranged above or below the set of vibrators. Unit 15 controls application of these time lags to the vibrators by means of control box 14.

In use where the vibrators emit each a monofrequency as described in French patent application 00 01,792 filed by the assignee, the time lag appears in form of a frequency phase shift related to the previous time lag by the relation $\phi$l=2$\pi$f ti.

According to the embodiment of FIG. 4, it is also possible to control sequential triggering of the vibrators placed in the well by associating with each one a seismic receiver such as a geophone G1. Each geophone is for example fastened to a support 16 arranged between two anchor bars 9. The geophones are connected respectively to acquisition and processing unit 15 outside the well. For real-time adjustment of the triggering delay of any vibrator $V_i$ in relation to the first one of the series, the effective traveltime of the waves between geophones is measured by means of any method of measuring the lag between signals, notably by carrying out a crosscorrelation between the signals delivered respectively by the geophones, either in the time domain or in the frequency domain, and vibrator $V_i$ is triggered by taking account of this effective traveltime. This time lag measurement can be performed by crosscorrelation. The time lags calculated by processing unit 15 are transmitted to control box 14 which accordingly delays the various vibrators in relation to the first one.

Vibrators comprising a single central pillar 1 have been described. Several pillars of piezoelectric sensitive elements could however be inserted between the two slabs 2, 3 without departing from the scope of the invention.

The invention claimed is:

1. A device for emitting waves in an underground formation, comprising at least one vibrator including two slabs, at least one motive element suited to generate vibrations and to communicate the vibrations to the slabs, and a generator for applying periodic control signals to the at least one motive element, wherein the at least one vibrator is positioned in a well or cavity and is embedded in at least one solid material providing coupling thereof with the underground formation, the at least one material is in contact with the two slabs over at least part of each of the respective faces thereof, the at least one vibrator comprises means for further increasing coupling of the at least one vibrator with the at least one solid material and the means for further increasing coupling includes anchor bars associated with at least one of the slabs.

2. A device as claimed in claim 1, wherein each slab comprises at least two plates disposed at a distance from one another and connected by anchor bars.

3. A device as claimed in claim 2, wherein an outer surface of each plate is provided with an uneven relief to increase an area of coupling of the device with the coupling material.

4. A device as claimed in claim 2, wherein the anchor bars are provided with an uneven relief to increase the area of coupling of the device with coupling material.

5. A device as claimed in claim 3, wherein the anchor bars are provided with an uneven relief to increase the area of coupling of the device with coupling material.

6. A device as claimed in claim 1, wherein the slabs are perforated so as to facilitate penetration of the coupling material in a space contained between the two slabs.

7. A device as claimed in claim 2, wherein the slabs are perforated so as to facilitate penetration of the coupling material in a space contained between the two slabs.

8. A device as claimed in claim 3, wherein the slabs are perforated so as to facilitate penetration of the coupling material in a space contained between the two slabs.

9. A device as claimed in claim 4, wherein the slabs are perforated so as to facilitate penetration of the coupling material in a space contained between the two slabs.

10. A device as claimed in claim 5, wherein the slabs are perforated so as to facilitate penetration of the coupling material in a space contained between the two slabs.

11. A device as claimed in claim 1 wherein each vibrator comprises a pillar of elements coated with a protective sheath, the at least one solid material being in contact with the protective sheath and the two slabs over at least part of each of the respective faces thereof.

12. A device as claimed in claim 2 wherein each vibrator comprises a pillar of elements coated with a protective sheath, the at least one solid material being in contact with the protective sheath and the two slabs over at least part of each of the respective faces thereof.

13. A device as claimed in claim 3 wherein each vibrator comprises a pillar of elements coated with a protective sheath, the at least one solid material being in contact with the protective sheath and the two slabs over at least part of each of the respective faces thereof.

14. A device as claimed in claim 4 wherein each vibrator comprises a pillar of elements coated with a protective sheath, the at least one solid material being in contact with the protective sheath and the two slabs over at least part of each of the respective faces thereof.

15. A device as claimed in claim 5 wherein each vibrator comprises a pillar of elements coated with a protective sheath, the at least one solid material being in contact with the protective sheath and the two slabs over at least part of each of the respective faces thereof.

16. A device as claimed in claim 6 wherein each vibrator comprises a pillar of elements coated with a protective sheath, the at least one solid material being in contact with the protective sheath and the two slabs over at least part of each of the respective faces thereof.

17. A device as claimed in claim 7 wherein each vibrator comprises a pillar of elements coated with a protective sheath, the at least one solid material being in contact with the protective sheath and the two slabs over at least part of each of the respective faces thereof.

18. A device as claimed in claim 8 wherein each vibrator comprises a pillar of elements coated with a protective sheath, the at least one solid material being in contact with the protective sheath and the two slabs over at least part of each of the respective faces thereof.

19. A device as claimed in claim 9 wherein each vibrator comprises a pillar of elements coated with a protective sheath, the at least one solid material being in contact with the protective sheath and the two slabs over at least part of each of the respective faces thereof.

20. A device as claimed in claim 10 wherein each vibrator comprises a pillar of elements coated with a protective sheath, the at least one solid material being in contact with the protective sheath and the two slabs over at least part of each of the respective faces thereof.

21. A method of generating in an underground formation vibrational signals according to an oriented emission pattern, comprising:
   installing in a well vibrators each comprising two slabs, at least one motive element for generating vibrations and to communicate the vibrations to the two slabs and a generator for applying periodic control signals to the motive element, each vibrator being positioned in a well or cavity and embedded in at least one solid material providing coupling thereof with the underground formation, the at least one solid material being in contact with the two slabs over at least part of each of the respective faces thereof and where each vibrator comprises means for further increasing coupling of the at least one vibrator with the at least one solid material, the means for further increasing coupling including anchor bars associated with at least one of the slabs; and
   sequentially controlling the vibrators by means of a control with time lags between respective triggering times that depend on intervals between locations of the vibrators and a velocity of propagation of waves in the formations surrounding the well, so as to obtain a directive emission.

22. A method as claimed in claim 21, wherein sequential control of the vibrators comprises applying to the vibrators control signals at a fixed frequency f whose phase $\Phi_i$ is related to said frequency f and to the time lag $t_i$ by a relation $$\Phi_i = 2.f.t_i.$$

23. A method as claimed in claim 21, wherein sequential control of the vibrators comprises applying to the vibrators control signals of fixed frequencies so as to allow separation thereof.

24. A method as claimed in claim 21, comprising coupling with the formation surrounding the well a seismic receiver and determining traveltimes of the waves respectively between each vibrator and receiver.

25. A method as claimed in claim 21, comprising adding to the vibrators receivers connected to a signal acquisition and processing unit and sequential triggering of the vibrators with time lags between the respective triggering times calculated by the unit by calculating a time lag between the signals produced by the receivers.

26. A device as claimed in claim 1 wherein:
   the means for increasing coupling is fastened to the slobs.

* * * * *